Nov. 20, 1928. 1,692,054
C. M. SEMLER
TIRE REPAIR PATCH
Filed Nov. 14, 1925
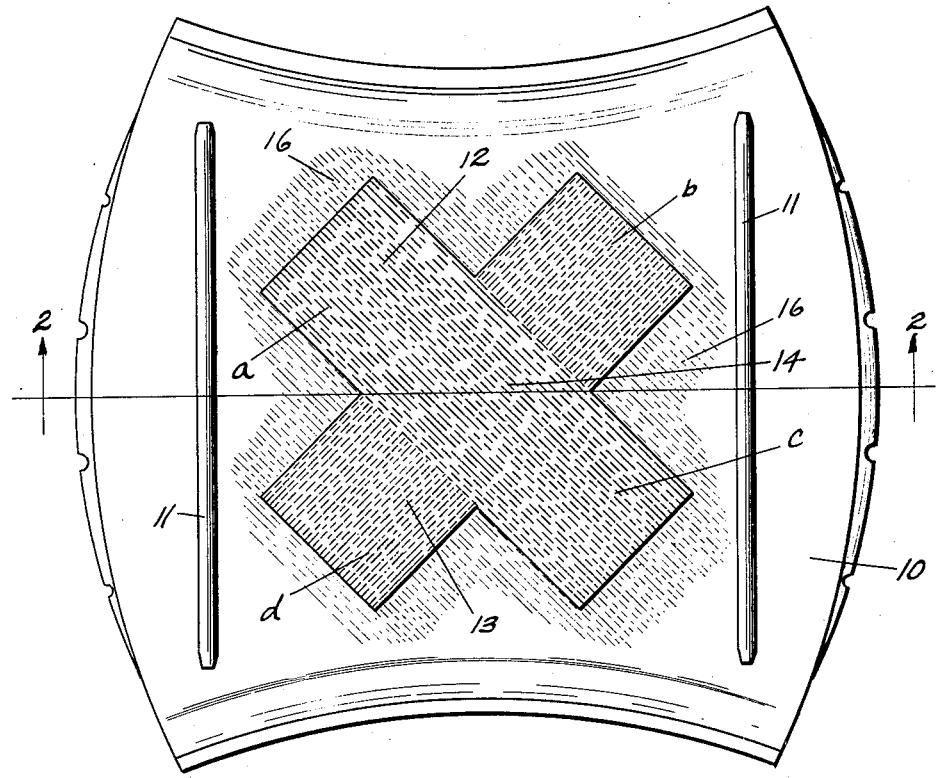
FIG.-1
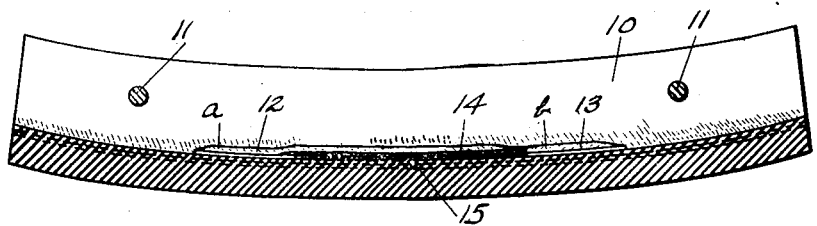
FIG.-2
INVENTOR.
CLYDE M. SEMLER
BY 
ATTORNEY.

Patented Nov. 20, 1928.

1,692,054

UNITED STATES PATENT OFFICE.

CLYDE M SEMLER, OF AKRON, OHIO, ASSIGNOR TO THE FIRESTONE TIRE AND RUBBER COMPANY, OF AKRON, OHIO, A CORPORATION OF OHIO.

TIRE-REPAIR PATCH.

Application filed November 14, 1925. Serial No. 69,019.

This invention relates to tire repair patches or the like, and particularly to inside patches for cord tire casings of either the regular, oversize or balloon types.

The general purpose of the invention is to provide an improved patch of rubberized cords adapted to be secured in the tire and to work with the tire in the same manner as the cords in the carcass thereof.

A particular object of the invention is to provide a patch comprising crossed strips of rubberized cords arranged substantially at right angles, the cords in each strip extending longitudinally thereof, each strip preferably being previously vulcanized, but having a work-contacting face of raw gum, such a patch, when made up at a factory, being also provided with a sheet of holland cloth over the raw gum surface.

By such a construction, a number of important advantages are obtained over prior patch constructions. The cross-shape provides for a two-ply area to be placed over the injury with single ply tabs for securely attaching it to the casing. The cords in both strips are long and uniform, thus giving full strength in the plies of the body of the patch over the injury. The shape of the patch facilitates placing or positioning the same in the casing so that its cords will extend in the directions of the cords in the carcass plies. The disadvantage of a flat spot being formed in tires, such as balloon tires, by use of round or oval patches, is avoided. The shape of the patch and its position on the tire is such that when the latter is in use, there will be no hinge action of the cords about any of the edges of the patch caused by either circumferential or transverse flexing actions under load. The construction of the present patch is also less expensive in manufacture and in use of material than constructions heretofore employed.

The foregoing and other objects are obtained by the patch construction illustrated in the accompanying drawings. It will be understood that the invention is not limited to the specific form thereof shown and described.

Of the accompanying drawings:

Figure 1 is a view of the inside of a section of a tire having the beads spread apart to illustrate a patch embodying the invention secured thereon; and Figure 2 is a section on line 2—2 of Figure 1.

Referring to the drawings, 10 designates a section of a tire casing, the beads of which have been spread apart by members 11, 11 for purposes of illustration. A patch embodying the invention is shown secured in the tire and comprises strips of rubberized cords 12 and 13 preferably previously vulcanized and provided with a facing of raw gum and laid over each other at right angles either previously to provide a cross-shape patch as a manufactured article or during the operation of patching the tire by use of strips cut from sheet material supplied for this purpose.

The strips 12 and 13 are of sufficient width to provide a two-ply body portion 14 of such area as to properly overlie an injury such as a break on the inner wall of the casing indicated at 15 in Figure 2. They are also of sufficient length to provide tabs $a$, $b$, $c$ and $d$ for use in securing the same in the tire.

In applying the patch, the under strip 13 preferably is arranged at right angles to the cords on the inner ply of the carcass which, in Figure 1, are indicated at 16, so that the plies in the body 14 of the patch will alternate in the same order as the plies in the carcass and will work therewith under the action of the load.

The tread of the tire at the injury may be repaired in any suitable way. To properly prepare the inside of the carcass for reception of the patch, the rough edges of the injury should be trimmed to prevent chafing, and cement should be applied in the form of a cross over the injury. The cement is allowed to dry and the hole is filled with cushion gum. The patch may then be applied, it being thoroughly stretched and carefully stitched into place. Gum strips may be applied about the edges of the patch, to protect cut ends etc. The patch may be used for obtaining an effective road repair without being vulcanized in the tire. Preferably, when possible, it should be vulcanized into the tire to become an integral part thereof.

It will appear from the foregoing that a greatly improved tire patch has been provided. It will also be apparent that modifications of the invention may be resorted to without departing from the spirit of the invention or the scope of the appended claims.

What is claimed is:

1. A repaired tire casing having an inside patch comprising two strips of rubberized cords, the cords running longitudinally of the strips, said strips having raw rubber faces, one of said strips being laid over the other substantially at right angles to each other and being of such width as to provide a two-ply body portion to cover the injury and of such length as to provide tabs projecting from the body portion, the lowermost strip being secured in the tire in a position substantially at right angles to the cords in the inner carcass ply.

2. An inside tire casing patch comprising two strips of rubberized cords, the cords running longitudinally of the strips, said strips having raw rubber faces, one of said strips being laid over the other substantially at right angles to each other and being of such width as to provide a two-ply body portion to cover the injury and of such length as to provide tabs projecting from the body portion.

3. A repaired tire casing having an inside patch comprising two strips of rubberized cords of a length greater than their width and having the cords extending longitudinally therein, said strips being arranged in overlapping, crossed relation substantially at right angles to each other to provide a two-ply body portion overlying the injury, and projecting tabs securing the patch in place in the tire.

4. A patch for use in repairing tires comprising strips of rubberized cords of a length greater than their width and having the cords extending longitudinally therein and having raw rubber faces, said strips being secured together substantially at right angles to each other to form a cross-shape.

5. A patch for use in repairing tires, said patch being of cross-shape and comprising two strips of rubberized cords having the cords in each strip extending longitudinally thereof, the strips being secured together substantially at right angles to each other to form a two-ply body portion having four projecting tabs thereon, said patch having a raw rubber face.

6. A patch for use in repairing tires, said patch being of cross-shape and comprising two strips of rubberized cords having the cords in each strip extending longitudinally thereof, the strips being secured together substantially at right angles to each other, said patch having a raw rubber face.

7. A patch for tires comprising rubberized cord strips secured together in cross formation with the cords extending longitudinally in each strip.

8. A repair patch for tire casings comprising a plurality of strips of straight cut cord fabric laminated in cross-wise relation so as to provide a reinforcing pad and four anchoring members extending therefrom in substantially the direction of the cords of the casing.

CLYDE M. SEMLER.